(12) United States Patent
Danzer et al.

(10) Patent No.: US 8,324,581 B2
(45) Date of Patent: Dec. 4, 2012

(54) RADIATION DETECTOR, LIGHT DETECTOR ARRANGEMENT, PRODUCTION METHOD AND IMAGING SYSTEM

(75) Inventors: Ludwig Danzer, Wendelstein (DE); Jan Wrege, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 87 days.

(21) Appl. No.: 12/647,578

(22) Filed: Dec. 28, 2009

(65) Prior Publication Data

US 2010/0163738 A1 Jul. 1, 2010

(30) Foreign Application Priority Data

Dec. 30, 2008 (DE) .......................... 10 2008 063 323

(51) Int. Cl.
*G21K 1/02* (2006.01)

(52) U.S. Cl. .................... 250/367; 250/366; 250/370.09; 250/370.11

(58) Field of Classification Search .................. 250/367, 250/366, 370.11, 370.09
See application file for complete search history.

(56) References Cited

U.S. PATENT DOCUMENTS

| 6,114,703 A | 9/2000 | Hoffman |
| 7,049,600 B2* | 5/2006 | Levin ........................ 250/363.04 |
| 7,208,740 B2* | 4/2007 | El-Hanany et al. ...... 250/370.09 |
| 2007/0007461 A1* | 1/2007 | Yanada et al. ........... 250/370.11 |

FOREIGN PATENT DOCUMENTS

| WO | WO 2006114715 A2 | 11/2006 |
| WO | WO 2006114716 A2 | 11/2006 |

* cited by examiner

*Primary Examiner* — Christine Sung
(74) *Attorney, Agent, or Firm* — Harness, Dickey & Pierce, P.L.C.

(57) ABSTRACT

An embodiment of the invention relates to a radiation detector which includes a plurality of radiation detector modules arranged adjacent to one another with in each case one scintillation element with a radiation inlet surface aligned transversely with respect to a main direction of a radiation, and light detector arrangements arranged transversely with respect to the radiation inlet surfaces of the scintillation elements. In the process of at least one embodiment, one light detector arrangement is arranged between two scintillation elements and has two light inlet surfaces which point away from one another, of which one is associated with a first scintillation element and one is associated with a second scintillation element. Furthermore, at least one embodiment of the invention relates to a light detector arrangement, a production method for a radiation detector according to at least one embodiment of the invention and/or an imaging system.

15 Claims, 3 Drawing Sheets

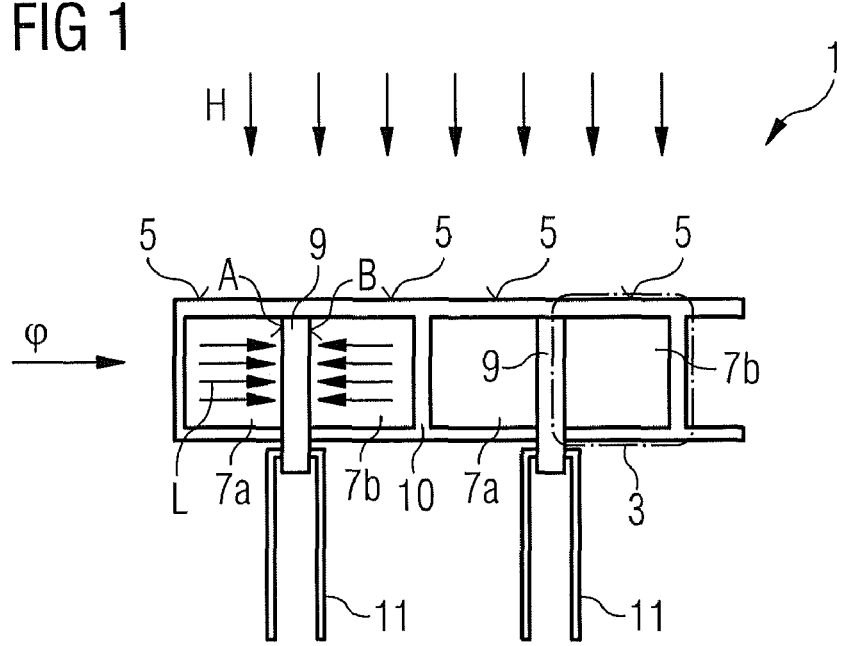
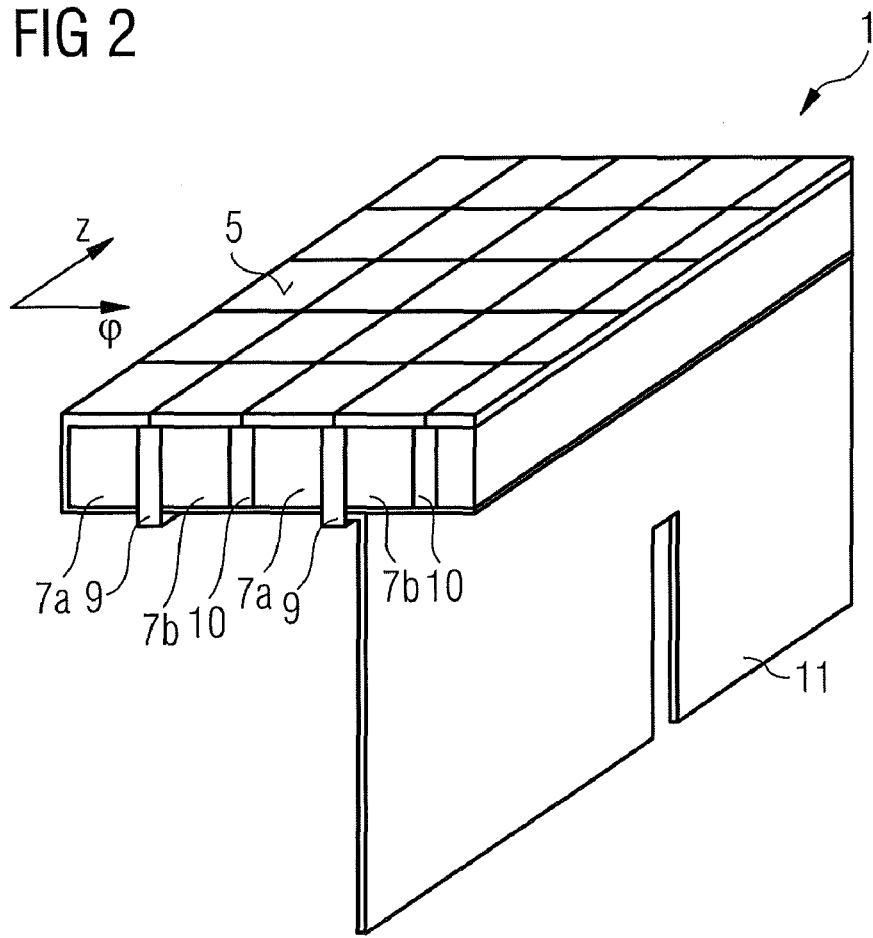

RADIATION DETECTOR, LIGHT DETECTOR ARRANGEMENT, PRODUCTION METHOD AND IMAGING SYSTEM

PRIORITY STATEMENT

The present application hereby claims priority under 35 U.S.C. §119 on German patent application number DE 10 2008 063 323.2 filed Dec. 30, 2008, the entire contents of which are hereby incorporated herein by reference.

FIELD

At least one embodiment of the present invention generally relates to a radiation detector. In at least one embodiment, it relates to a detector comprising a plurality of radiation detector modules arranged adjacent to one another with in each case one scintillation element with a radiation inlet surface aligned transversely with respect to a main direction of a radiation, and light detector arrangements arranged transversely with respect to the radiation inlet surfaces of the scintillation elements. Furthermore, at least one embodiment generally relates to a light detector arrangement for such a radiation detector, a method for producing such a radiation detector and/or an imaging system, preferably a computed tomography scanner.

BACKGROUND

Radiation detectors for computed tomography scanners generally comprises rows or matrices of so-called pixels arranged adjacent to one another, that is to say of individual radiation detector modules which directly or indirectly convert incident (X-ray) radiation into electrical signals which can subsequently be used to derive projection images therefrom, which images can be processed further for reconstructing an image of an examination object to be imaged.

In the case of indirect conversion of the incent radiation, so-called scintillation elements are used, which first of all convert the radiation into light (usually in the visible wavelength band). The scintillation elements are separated from one another by so-called septa which have light-reflecting materials inserted into them in order to prevent light pulses generated in the individual elements from passing into adjacent pixels. Likewise, the radiation inlet surface toward the interior of the scintillation elements is designed to reflect. A light detector arrangement, for example in the form of a photodiode, then converts the light into electrical signals.

Until now, the light detector arrangements were attached below the scintillation elements, i.e. the light inlet surfaces thereof used to be parallel to the radiation inlet surface of the scintillation elements. The electronic system used for further signal processing, preferably converter elements for the electrical signals, was then attached to the side of the light detector arrangements opposite to the radiation inlet surface.

For quite some time now, the tendency has been to reduce the size of the pixels in the z- and φ-directions, that is to say in the directions which approximately form a plane which is basically aligned perpendicularly with respect to the main direction of the radiation to be detected. In the following text, the main direction of the radiation to be detected is considered to be the direction of propagation of the radiation in which the substantial portion of the radiation to be detected is incident on the radiation detector and which can for example be defined by a collimator or the like arranged upstream of the detector.

In the process, it is usually ensured that the radiation to be detected is basically incident on the radiation inlet surface in a perpendicular fashion, that is to say that the main direction is perpendicular with respect to the radiation inlet surface. Basically perpendicular should in this case respectively be understood to mean that the respective directions are perpendicular with respect to one another within certain tolerances. The reduction of pixel size can achieve both higher time and spatial resolutions in radiation detectors. However, in the arrangement of radiation detector modules with scintillation elements and light detector arrangements attached to the underside described above, this also automatically reduces the size of the detection surface of the light detector arrangements and leads to the undesired effect that increasing the miniaturization reduces the number of light quanta generated and the light collection becomes less and less efficient. In the end, the strength of the measurement signals is reduced and so interference effects such as more noticeable noise become more emphasized.

WO 2006/114715 A2 and WO 2006/114716 A2 point toward a solution to this problem. Therein, the light detector arrangements are in each case not on the underside of the scintillation elements, but are on the side between the scintillation elements. Since the pixel heights can, in contrast to the extents parallel to the detector surface, only be varied slightly, a sufficient size of the light detector arrangements is maintained for the light collection efficiency when there is such a lateral readout of the light signals, even when the pixels are reduced in size.

However, a further problem during the miniaturization of the scintillator pixels consists of the fact that the number of pixels per unit area or per detector length unit attained thereby, that is to say the so-called pixel density, makes the signal processing more complicated. The technical limits of producible printed circuit board densities are already being reached these days. If anything, this problem is further increased in the case of a lateral arrangement of the light detector arrangements, because now the electronic system which used to have space on the underside of the light detector arrangements now no longer has sufficient space.

SUMMARY

In at least one embodiment of the invention, an option is provided for improved utilization of space within a detector design with light detector arrangements attached between scintillation elements.

Accordingly, in a radiation detector of at least one embodiment, one light detector arrangement is arranged between two scintillation elements and has two light inlet surfaces which point away from one another, of which one is associated with a first scintillation element and one is associated with a second scintillation element.

Thus, in at least one embodiment, a common light detector arrangement is situated between respectively a first and a second scintillation element, the light inlet surfaces of which detector arrangement respectively point in the direction of one of the two scintillation elements, and so the latter are aligned in opposite directions. The light detector arrangement is situated in a septum between the scintillation elements.

This leads to a significant simplification in the design of the radiation detector, because now a light detector arrangement is only inserted into every second septum, which detector arrangement converts light signals from both the first and the second scintillation element into voltage pulses. Thus, there is no light detector arrangement in the respective other septum which delimits a scintillation element in the same arrangement direction as the septum filled by the light detector arrangement. In addition to saving material, this mainly results in a simplification of the design in respect of the spatial requirement of the light detector arrangements and the continuative lines connected thereto which now likewise only lead away from every second septum.

Accordingly, a light detector arrangement according to at least one embodiment of the invention has two light inlet surfaces which point away from one another, one of which can be associated with a first scintillation element and one can be associated with a second scintillation element of the radiation detector. Thus, the light detector arrangement can be provided as a separate component.

Such a component can be used in a method according to at least one embodiment of the invention for producing a radiation detector which comprises at least the following steps:

a) providing a detector blank with a number of scintillation elements arranged adjacent to one another with a radiation inlet surface aligned transversely with respect to a main direction of a radiation, b) providing light detector arrangements which have two light inlet surfaces which point away from one another, c) applying the light detector arrangements between the scintillation elements such that one light inlet surface is associated with a first scintillation element and another light inlet surface is associated with a second scintillation element, wherein the light inlet surfaces of the light detector arrangements are arranged transversely with respect to the radiation inlet surfaces of the scintillation elements.

Thus, use is made of a light detector arrangement according to at least one embodiment of the invention which is inserted into the interspaces, i.e. the septa of a detector blank. Here, a detector blank is defined as a radiation detector which has not yet been assembled completely, but which already has scintillation elements which have been separated from one another and between which the light detector arrangement can be inserted.

The production method according to at least one embodiment of the invention is also significantly simplified compared to the abovementioned prior art, because a light detector arrangement now only has to be inserted into every second septum.

Finally, at least one embodiment of the invention comprises an imaging system with a radiation detector according to at least one embodiment of the invention and/or a light detector arrangement according to at least one embodiment of the invention.

Further particularly advantageous refinements and developments of at least one embodiment of the invention also result from the dependent claims and the following description. In the process, the radiation detector and the light detector arrangement, as well as the production method and the imaging system, can in each case be developed in accordance with the dependent claims of the other claim categories.

The light detector arrangement of at least one embodiment can be designed as a component which converts light pulses from the two scintillation elements into voltage pulses in one and the same functional region. However, the light detector arrangement of at least one embodiment preferably comprises two light detector units which can be operated independently of one another and which respectively form one of the light inlet surfaces. These light detector units then particularly preferably each have their own connection contacts, and so they act as completely self-sufficient units which are only connected to one another as a result of their common assembly within the light detector arrangement. A light detector unit can in turn have a plurality of partial units which are independent of one another.

A particularly advantageous embodiment then includes the light detector arrangement comprising two back-to-back conjoined light detector units which have preferably been adhesively bonded or polymer- or fusion bonded.

Thus, the light detector units which can be operated independently of one another are firstly produced as individual components and are then conjoined back-to-back using methods which are as sparing as possible. In the process, conjoining is also possible by a first light detector unit being provided on a substrate, with the second light detector unit being built on the rear side thereof, for example by coating with a light-sensitive material.

The above-cited documents regarding the prior art provide for a design of the radiation detector modules made of two scintillation elements arranged above one another in the main direction of the radiation. In other words, the corresponding radiation detector module comprises a double-layer scintillation element. Such a refinement is also possible within the scope of at least one embodiment of the present invention. However, by contrast, it is particularly advantageous for the scintillation elements to be formed from an inherently homogeneous scintillation layer because, for example, the design is much simpler. In particular, this can save signal lines and possibly circuits.

Moreover, in accordance with a particularly advantageous embodiment of the invention, the light detector arrangement and/or the light detector units are arranged on a (common) support. The support can be flexible but it is preferably made of a stiff material—for example in the form of a common printed circuit board—because as a result of this it is easier to insert said support into the septa between the individual scintillation elements.

A particularly advantageous development includes the light detector arrangement being arranged on the support together with at least one converter device.

The converter device is preferably at least one analog/digital converter, possibly also connected to further signal conversion elements and/or signal circuit elements such as multiplexers. By arranging the light detector arrangement and the converter device on a common support, more space can, in particular, be saved on the underside (i.e. on the side opposite to the radiation inlet surface) of the radiation detector. In particular, line guides which are complicated and prone to error both mechanically and in terms of signaling become superfluous. Thus, on the one hand, the solution is particularly space-saving and moreover offers the advantage of affording the possibility of directly coupling to one another electronic elements which are assigned to one another. In particular, this affords the possibility of providing an electrical connection at a defined distance (preferably equaling zero) between the individual elements without additional cable connections. This possibility of completely avoiding cable lines moreover leads to a significant reduction in the input capacitance of the analog/digital converters and thus the noise properties are also significantly improved during the measurement.

The support particularly preferably basically extends in a plane aligned parallel to the main direction of the radiation to be detected. In other words, the support is a basically planar component, the alignment of which is defined by the radiation main direction or by the septa which are arranged between the scintillation elements and which are preferably arranged parallel to the radiation main direction. The advantage of the planar alignment is that every support is situated in, and possibly in the continuation of, a septum and therefore basically sticks out perpendicularly with respect to the rear side of the scintillation elements (i.e. with respect to the side opposite to the radiation inlet surface). It can thus easily be recognized and contacted; its structuring can clearly be seen even from the rear side of the radiation detector, and individual elements—for example the individual supports—are easily accessible and, if need be, can be replaced.

Furthermore, a particular advantage results from the converter device being arranged on a side of the scintillation element pointing away from the radiation inlet surface. Thus, the converter device is attached to the rear-side region of the radiation detector and spatially constitutes a continuation of the light detector arrangement. In the process, the converter device on the support protrudes beyond the rear limit of the scintillation element, as a result of which it can easily be connected to continuative lines and simultaneously uses a space which is no longer used for other purposes due to the installation of the light detector arrangement between the scintillation elements.

An imaging system according to at least one embodiment of the invention is preferably designed such that the radiation detector extends along a circular or arced path running around an axis of rotational symmetry. Here, this preferably is a computed tomography scanner or a PET (positron emission tomography) or SPECT (single photon emission computed tomography) system.

In the process, a row of light detector arrangements of the radiation detector is preferably arranged on a light detector bar structured in a direction parallel to the axis of rotational symmetry. This direction, which is generally referred to as the z-direction or the insertion direction of examination objects into the imaging system, defines the so-called detector width, that is to say the extent to which an examination object is covered by the detector during a circulation with a position of the examination object remaining constant in relation to the rotational plane of the detector. A light detector bar can be structured along this width such that a plurality of light detector arrangements are formed therefrom and cover individual pixels, i.e. individual radiation detector modules. The light detector bar preferably extends over the entire detector width. Accordingly, the planes of preferably all light detector arrangements of the radiation detector are preferably aligned in precisely the direction of the detector width, i.e. parallel to the axis of rotational symmetry.

An imaging system according to at least one embodiment of the invention is preferably distinguished by the fact that a light detector arrangement is arranged between every second scintillation element in the direction parallel to the axis of rotational symmetry and/or in the angular direction of the radiation detector. It thus uses the saving potential realized by at least one embodiment of the invention to the fullest. It is particularly advantageous for the outermost scintillation elements in an arrangement direction of the light detector arrangements to complete a row of scintillation elements and light detector arrangements. This means that the radiation detector respectively terminates with a scintillation element at its lateral outer borders in the direction parallel to the axis of rotational symmetry and in the direction of rotation, while the light detector arrangement associated with this scintillation element lies between this and another scintillation element. This exploits the saving effect in terms of space and material in an optimal fashion within the scope of the invention and, moreover, the light detector arrangements are all protected from external effects on both sides by scintillation elements.

BRIEF DESCRIPTION OF THE DRAWINGS

The invention will once again be explained in the following text on the basis of example embodiments with reference to the attached figures. Here, the same components are provided with identical reference signs in the various figures, in which:

FIG. 1 shows a lateral sectional view through an example embodiment of part of a radiation detector according to the invention, FIG. 2 shows a perspective view of the part of the radiation detector from FIG. 1.

DETAILED DESCRIPTION OF THE EXAMPLE EMBODIMENTS

Figure 3:
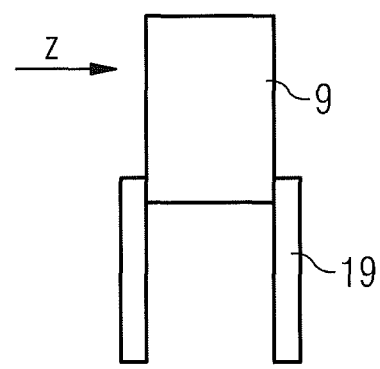
FIG. 3 shows a side view of an individual light detector arrangement according to an embodiment of the invention.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

FIG. 1 shows part of a radiation detector 1 for detecting X-ray radiation within the scope of a computed tomography scanner. It has a plurality of radiation detector modules 3 with scintillation elements 7a, 7b and light detector arrangements 9. On their upper side which points against the main direction H of the X-ray radiation, the radiation detector modules 3 have radiation inlet surfaces 5 through which the X-ray radiation impinges into the scintillation elements 7a, 7b. The scintillation elements 7a, 7b are respectively separated from one another by septa 10. In the angular direction ϕ of the radiation detector in the computed tomography scanner, the light detector arrangements 9 are in this case only assigned to every second septum 10. This is because they have two light inlet surfaces A, B which point away from one another and are respectively associated with one scintillation element 7a or 7b. This figure does not show collimator sheets for filtering scattered radiation, which usually protrude perpendicularly from the radiation inlet surfaces 5 on the septa 10 in such detectors, that is to say which are aligned against the main direction H of the X-ray radiation.

The X-ray radiation impinging into the scintillation elements 7a, 7b in the main direction H of the X-ray radiation is converted into light radiation L—usually in the visible wavelength band—at said location. As a result of reflection on the septa, the radiation inlet surfaces 5 and the undersides of the scintillation elements 7a, 7b lying opposite the radiation inlet surfaces, the light radiation is respectively guided in the direction of the light inlet surfaces A, B of the light detector arrangements 9, where voltage signals are derived from the light pulses. These signals are passed on to further processing units via lines on a support 11.

FIG. 2 shows the same part of the radiation detector 1 in a perspective view. It shows that said radiation detector also extends over a plurality of radiation detector modules 3 in the z direction. In the computed tomography scanner, this z direction is the insertion direction of an examination object, and so the number of radiation detector modules 3 arranged in this direction defines the detector width. FIG. 2 shows in particular that the support 11 extends over the entire detector width.

Compared to the prior art, the use of the design illustrated here in an example fashion now affords the possibility of only providing every second septum with a light detector arrangement 9 in the angular direction ϕ, i.e. in the arrangement direction of such light detector arrangements 9, with the septa situated in between in each case no longer having to have a light detector arrangement 9. Thus, half of the light detector arrangements required in the prior art, and in particular the space required for this, can be saved.

The illustration in FIGS. 1 and 2 should be understood in a purely schematic fashion. It is neither drawn to scale (nor are the following figures), nor is the fact taken into account that the radiation detector 1 generally has a curved design in the angular direction ϕ. This illustrative form is used to simplify the illustration of the circumstances.

An example embodiment of a light detector arrangement 9 is illustrated in FIG. 3. It has two contacts 19 by which the signals generated by said detector arrangement can be picked up. This light detector arrangement 9 is designed in the form of a single-arrangement, i.e. it is not part of a larger overall combination and, in particular, it is not inherently structured. It is particularly suitable for application in radiation detectors in rows, which only have a single radiation detector module in the z direction and consist of radiation detector modules which are arranged next to one another in the ϕ direction.

Figure 4:
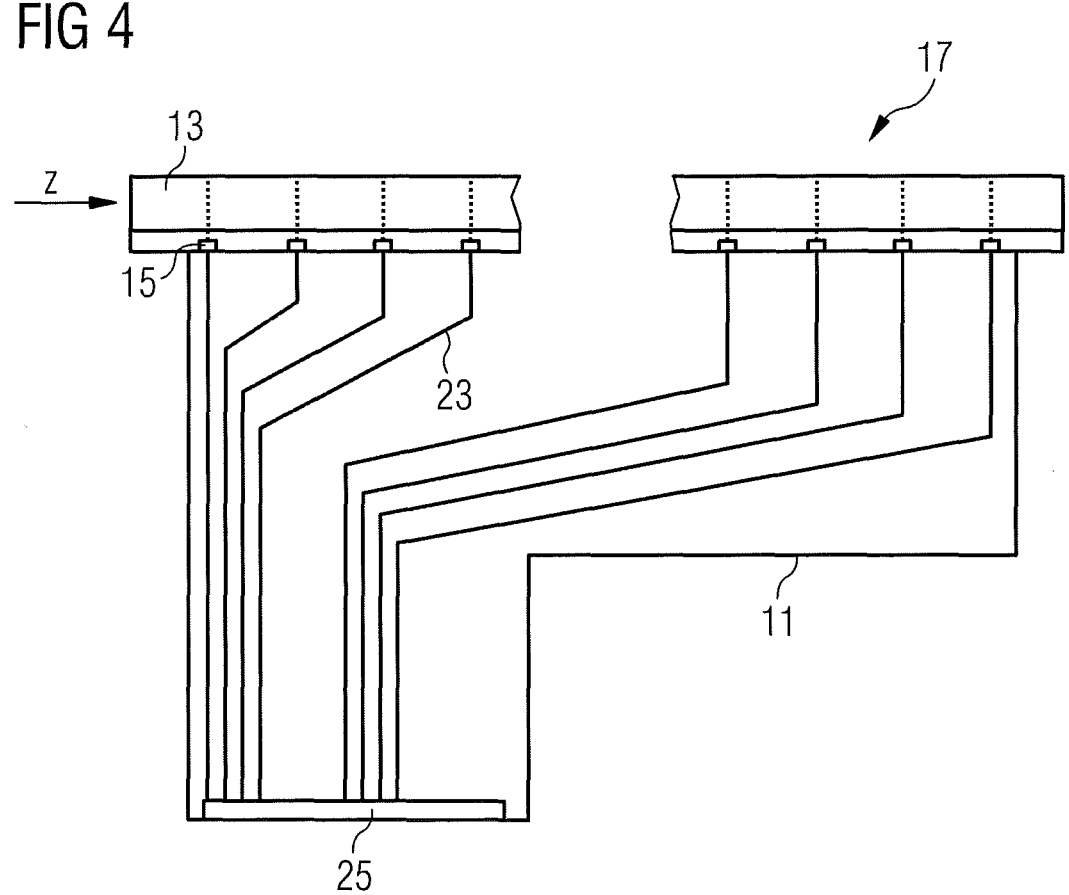
FIG. 4 shows a side view of a light detector bar with a flexible support substrate according to a first embodiment.
Figure 5:
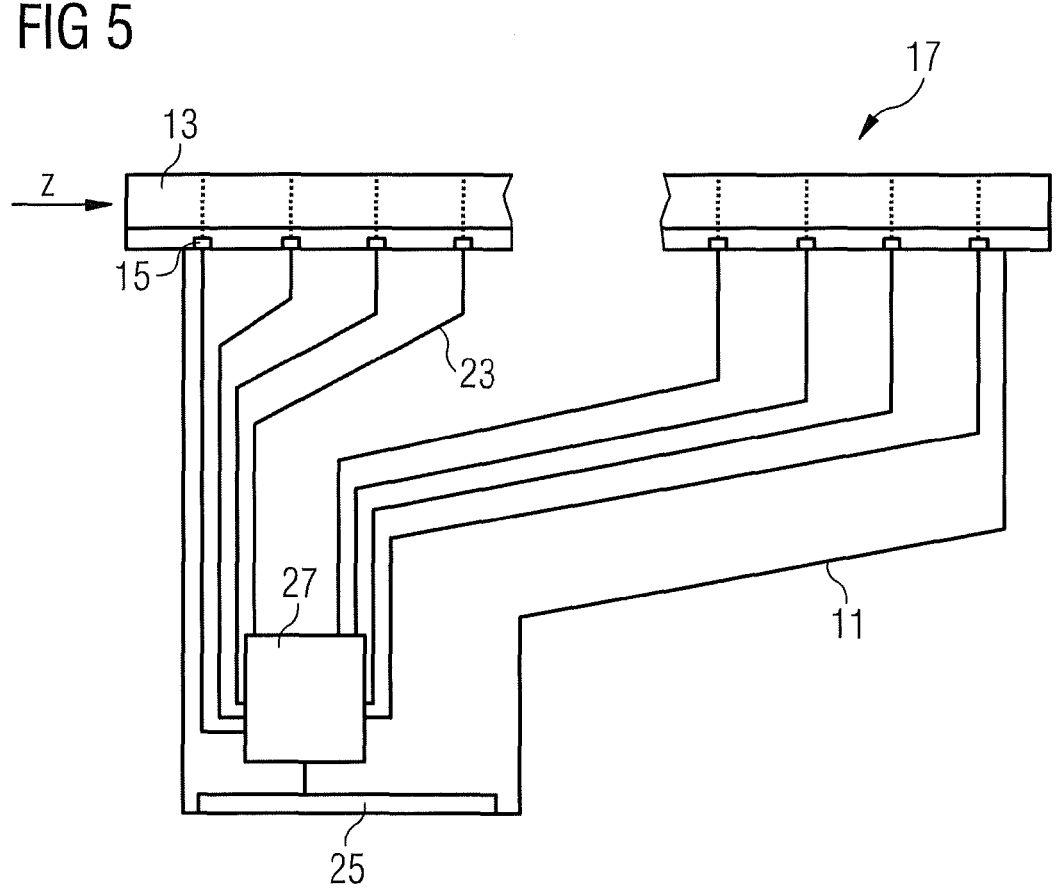
FIG. 5 shows a side view of a light detector bar with a flexible support substrate according to a second embodiment.

FIGS. 4 and 5 both show a light detector bar 17 which, as a result of structuring, is subdivided into individual segments 13 in the z direction (indicated here by dashed lines), which form the one side of a light detector arrangement 9. The light detector bar 17 has a contact region 15 for each segment 13 formed by the structuring, where the signals of this segment 13 can be picked up. The structuring of the light detector bar 17 into segments 13 is particularly advantageous in that only one whole unit has to be inserted into the septa over the entire detector width of the radiation detector 1.

In FIG. 4, the light detector bar 17 is contacted on its contact regions 15 by conductor tracks 23 which are fixed on a flexible support 11, for example printed thereon or etched out of a printed circuit board made of flexible foil. These conductor tracks all lead to a connection element 25 which can, for example, be designed as a plug, but can also be formed as a soldering connection or a connection with the aid of an electrically conductive adhesive.

Since the signals are passed on from the contact regions 15 via the conductor tracks 23 arranged on the common support 11, these conductor tracks 23 are spatially assigned to a certain region and as a result of this the arrangement of the wiring is significantly simplified. Moreover, the support 11 can simultaneously serve as a support for the light arrangements 9, which support is passed on further only on the underside of the radiation detector 1.

FIG. 5 shows the same arrangement as in FIG. 4, but in this case there is a component 27 which is attached to the support 11. This can already carry out a first signal processing operation in the immediate vicinity of the light detector arrangements 9, particularly analog/digital conversion of the received signals. The component 27 therefore preferably comprises an analog/digital converter.

In respect of the illustrations of FIGS. 3 to 5, reference should be made to the fact that the illustrated light detector bar 17 and the individual light detector arrangement 9 from FIG. 3 only show one of the two light inlet surfaces A or B in a planar view. This means that there is a second light inlet surface with an analog design on the side of the light detector bar 17 or individual light detector arrangement 9 which faces away from the observer.

Finally, reference is again made to the fact that the method described in detail above and the illustrated apparatus are merely exemplary embodiments which a person skilled in the art can modify in various ways without departing from the scope of the invention. Furthermore, the use of the indefinite article "a" or "an" does not preclude the relevant features from being present a number of times.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, computer readable medium and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable medium and is adapted to perform any one of the aforementioned methods when run on a computer device (a device including a processor). Thus, the storage medium or computer readable medium, is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A radiation detector, comprising:
a plurality of radiation detector modules arranged adjacent to one another, each of the plurality of radiation detector modules including one detector unit, the detector unit including,
two scintillation elements with a radiation inlet surface aligned transversely with respect to a main direction of a radiation, and
a light detector between the two scintillation elements arranged transversely with respect to the radiation inlet surfaces of the two scintillation elements, the light detector including a first light inlet surface associated with a first scintillation element of the two scintillation elements and a second light inlet surface associated with a second scintillation element of the two scintillation elements, the first light inlet surface and the second light inlet surface pointing away from each other.

2. The radiation detector as claimed in claim 1, wherein the scintillation elements are formed by a homogeneous scintillation layer.

3. The radiation detector as claimed in claim 1, wherein at least the light detector and the detector unit is arranged on a support.

4. An imaging system comprising the radiation detector as claimed in claim 1.

5. The imaging system as claimed in claim 4, wherein the radiation detector extends along a circular or arced path running around an axis of rotational symmetry.

6. The imaging system as claimed in claim 5, wherein a row of detector units of the radiation detector is arranged on a light detector bar structured in a direction parallel to the axis of rotational symmetry.

7. The imaging system as claimed in claim 6, wherein planes of light detector arrangements of the radiation detector are aligned in a direction which is parallel to the axis of rotational symmetry.

8. The imaging system as claimed in claim 6, wherein a light detector arrangement is arranged between every second scintillation element in at least one of the direction parallel to the axis of rotational symmetry and the angular direction of the radiation detector.

9. The imaging system as claimed in claim 5, wherein planes of detector units of the radiation detector are aligned in a direction which is parallel to the axis of rotational symmetry.

10. The imaging system as claimed in claim 9, wherein a light detector arrangement is arranged between every second scintillation element in at least one of the direction parallel to the axis of rotational symmetry and the angular direction of the radiation detector.

11. The imaging system as claimed in claim 5, wherein a support unit is arranged between every second scintillation element in at least one of the direction parallel to the axis of rotational symmetry and the angular direction of the radiation detector.

12. A light detector arrangement for a radiation detector comprising:
a light detector including,
a first light inlet surface associated with a first scintillation element including a first radiation inlet surface aligned transversely with respect to a main direction of a radiation, and
a second light inlet surface associated with a second scintillation element, the first light inlet surface and the second light inlet surface pointing away from each other and the second scintillation element including a second radiation inlet surface aligned transversely with respect to the main direction of a radiation.

13. A radiation detector comprising the light detector arrangement of claim 12.

14. A method for producing a radiation detector, comprising:
providing a detector blank with a number of scintillation elements arranged adjacent to one another with a radiation inlet surface aligned transversely with respect to a main direction of a radiation;
providing a light detector including two light inlet surfaces which point away from one another;
applying one light detector between two of the scintillation elements such that one of the two light inlet surfaces is associated with a first scintillation element and another of the two light inlet surfaces is associated with a second scintillation element, wherein
the light inlet surfaces of the detector are arranged transversely with respect to the radiation inlet surfaces of the scintillation elements.

15. The method as claimed in claim 14 wherein the two light inlet surfaces are back-to-back and have been adhesively bonded or polymer- or fusion bonded.

* * * * *